United States Patent [19]

Stoller et al.

[11] 4,185,564
[45] Jan. 29, 1980

[54] TRAILER HITCH YOKE POSITIONING ASSEMBLY

[75] Inventors: Patricia S. Stoller, St. Louis; James C. Hammonds, St. Charles; John O. Kloepper, Moline Acres; Arnold Schlobohm, Ballwin, all of Mo.

[73] Assignee: ACF Industries, Incorporated, New York, N.Y.

[21] Appl. No.: 844,665

[22] Filed: Oct. 25, 1977

[51] Int. Cl.² ............... B61D 3/16; B61D 45/00; B65J 1/22; F16B 9/02
[52] U.S. Cl. ................................ 410/64; 280/435; 410/59
[58] Field of Search ............ 105/368 B, 368 S; 203/16; 248/119 S; 280/432, 434, 435, 436, 439; 403/13, 14, 317, 322, 325

[56] References Cited

U.S. PATENT DOCUMENTS

| | | | |
|---|---|---|---|
| 1,981,233 | 11/1934 | Harris | 280/434 |
| 1,991,507 | 2/1935 | Ketel | 280/434 |
| 1,995,965 | 3/1935 | Davidson et al. | 203/16 X |
| 1,999,375 | 4/1935 | Seyferth et al. | 280/435 |
| 2,936,983 | 5/1960 | Markestein et al. | 105/368 B X |
| 3,225,707 | 12/1965 | Rollins et al. | 105/368 S |
| 3,234,893 | 2/1966 | Sweda | 105/368 S |
| 3,262,402 | 7/1966 | Mowatt-Larssen et al. | 105/368 S |
| 3,632,145 | 1/1972 | Davis | 248/119 S X |
| 3,827,709 | 8/1974 | Madura et al. | 280/439 |
| 3,892,426 | 7/1975 | Ferris | 280/432 |

FOREIGN PATENT DOCUMENTS 1387997  3/1975  United Kingdom ............... 105/368 S Primary Examiner—Joseph F. Peters, Jr.
Assistant Examiner—Howard Beltran
Attorney, Agent, or Firm—Henry W. Cummings

[57] ABSTRACT

In a railway car trailer hitch in which a yoke maintains a pair of jaws in position engaging the trailer king pin in closed position, a pivotably mounted cam assembly is provided which moves the yoke to the open position and a stop is automatically activated when the yoke reaches the open position which maintains the yoke in open position for removal of the trailer from the hitch.

12 Claims, 9 Drawing Figures

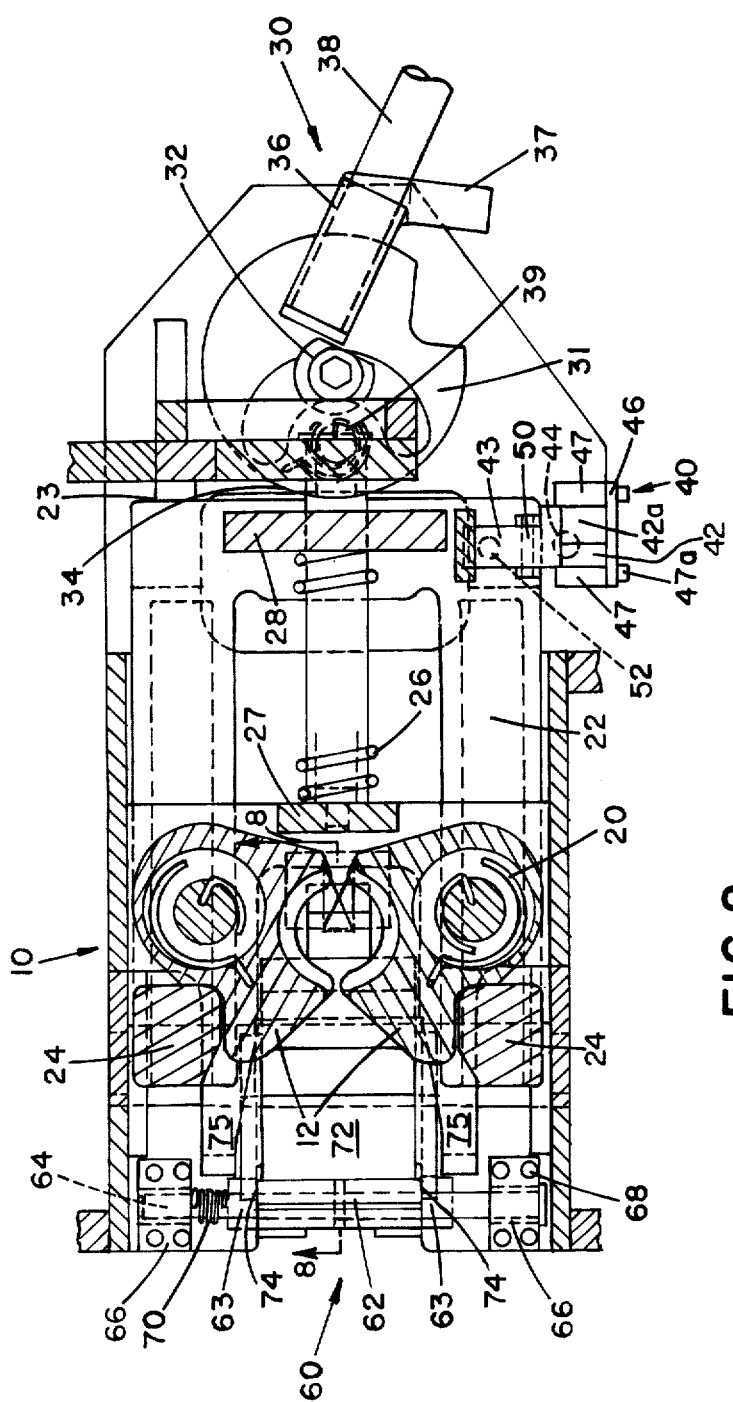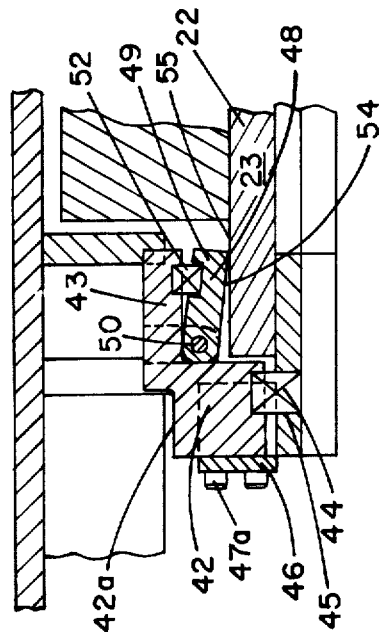

TRAILER HITCH YOKE POSITIONING ASSEMBLY

BACKGROUND OF THE INVENTION

This invention relates to trailer hitches for attaching piggybank containers and trailers onto flat cars for over-the-rail transport, and to other applications such as barges where container trailer hitches are utilized.

In the past hitches for maintaining piggybank containers and trailers in place on railway flat cars have utilized a pair of jaws which hold the king pin of the trailer in place on the car. A yoke engages the jaws to maintain the jaws in closed position in transit. A heavy spring biases the yoke into the closed position. To remove the king pin from the jaws, the yoke is moved forward to allow the jaws to open under the action of a tractor or overhead crane.

Previously in order to move the yoke to the open position it was necessary for the operator to insert a bar into the hitch and apply a lever action to force the yoke forward. While maintaining the lever action on the yoke in the open position, the operator was required to manually actuate a stop to hold the yoke in the open position. This was a difficult operation for the operator and at times could be dangerous. This operation required the operator to be on the car to carry out these steps.

In U.S. Pat. No. 3,632,145 a block is movable by force of an operating bar until a spring biased trigger moves vertically to engage the front surface of the block. However to hold the block in open position, the jaws must be manually opened in this patent, necessitating the operator climbing on the car to open the jaws which is considered by some to be a safety hazard.

SUMMARY OF THE INVENTION

The object of the present invention is to provide an arrangement whereby the operator may move the jaws of a trailer hitch to open position to remove the trailer without climbing on the car to open the jaws, thus making the jaw opening operation easier and safer for the operator.

In accordance with the present invention a pivotably mounted cam assembly is provided to move the yoke to an open position. As the yoke reaches the open position, a stop is activated which engages the yoke and holds the yoke in open position. Springs automatically move the jaws to an open position. The trailer can then be removed vertically by an overhead crane or horizontally with a tractor.

THE DRAWINGS

FIG. 2 is a plan sectional view looking in the direction of the arrows along the line 2—2 in FIG. 1;

FIG. 3 is a partial vertical sectional view looking in the direction of the arrows along the line 3—3 in FIG. 1;

DESCRIPTION OF PREFERRED EMBODIMENTS

Figure 1:
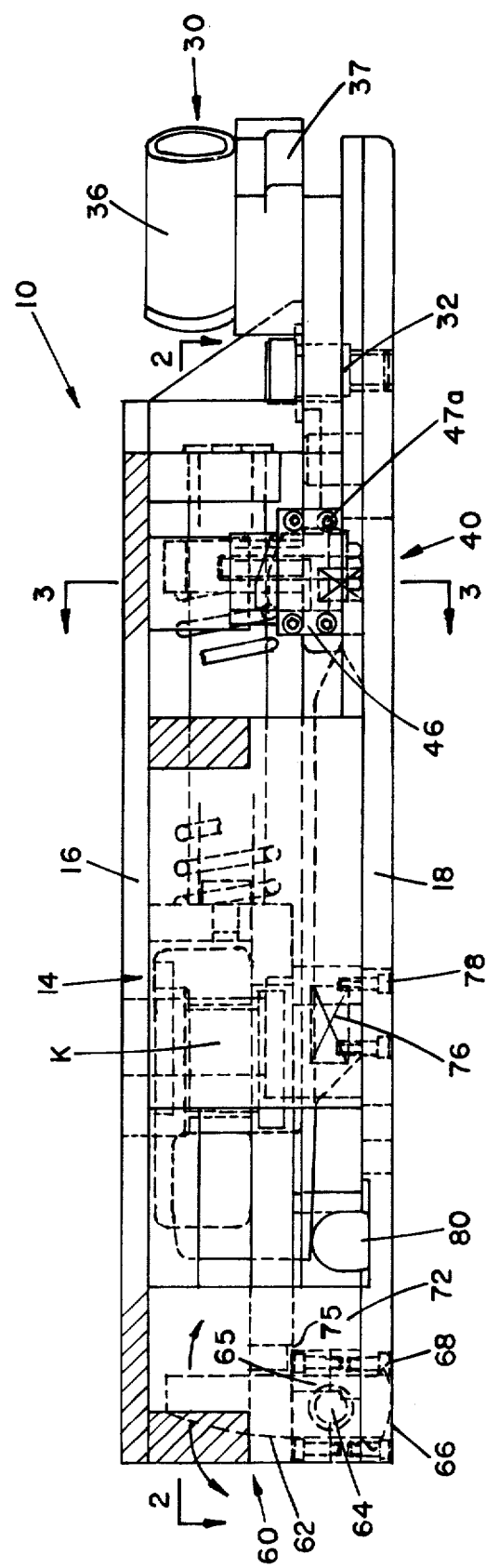
FIG. 1 is a side elevation view of the hitch head assembly of the present invention.
Figure 4:
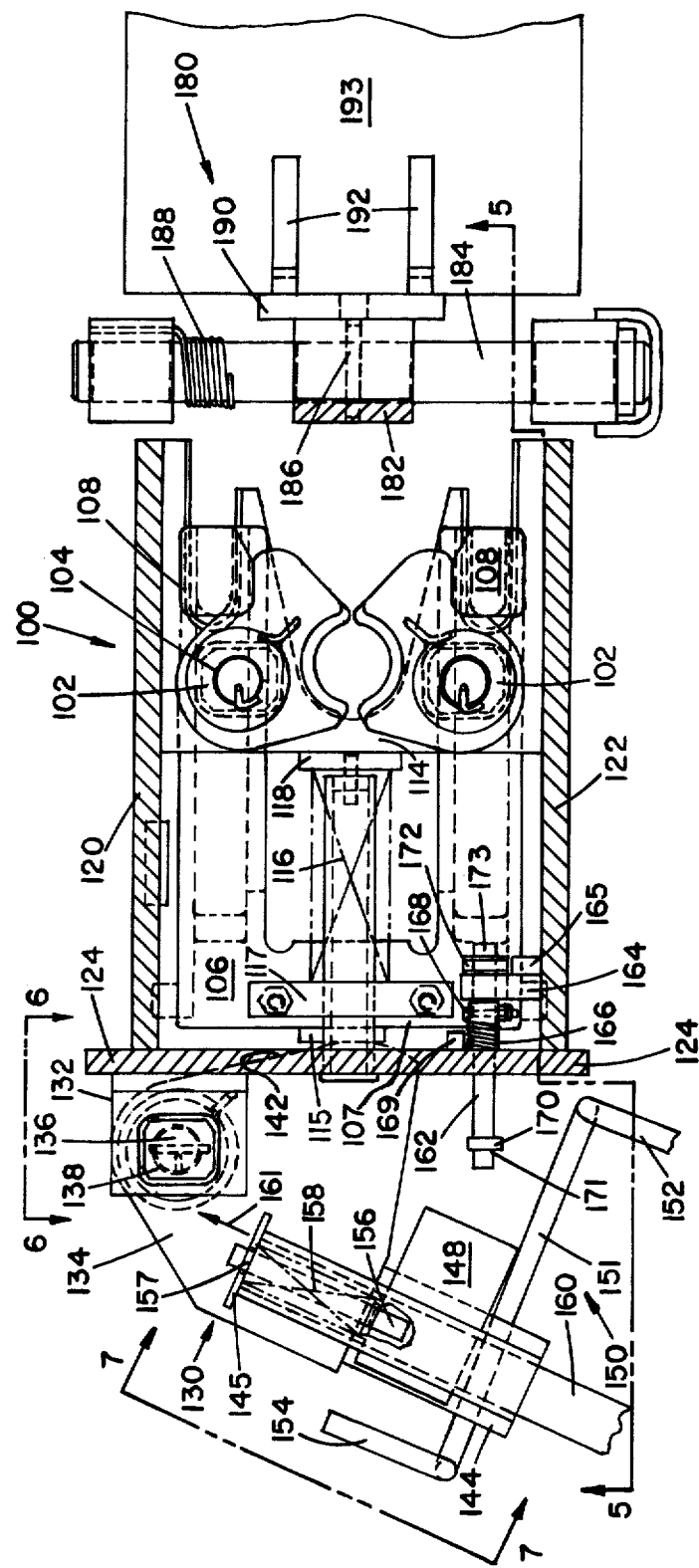
FIG. 4 is a plan view of another embodiment of the present invention looking in the direction of the arrows along the line 4—4 in FIG. 5.
Figure 5:
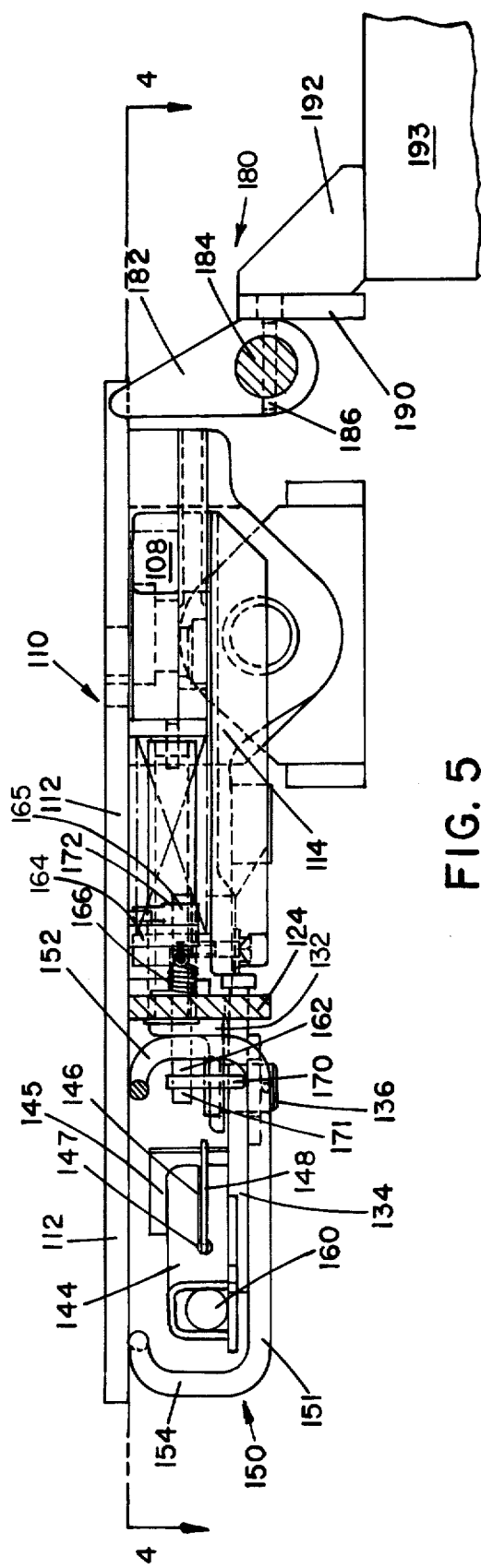
FIG. 5 is a view partly in section looking in the direction of the arrows along the line 5—5 in FIG. 4.
Figure 6:
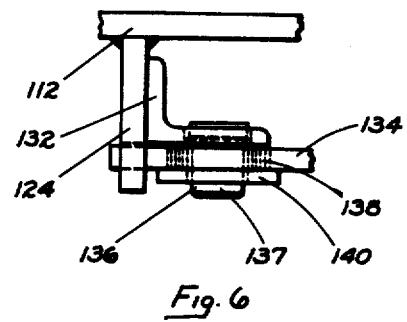
FIG. 6 is a view looking in the direction of the arrows along the line 6—6 in FIG. 4.
Figure 7:
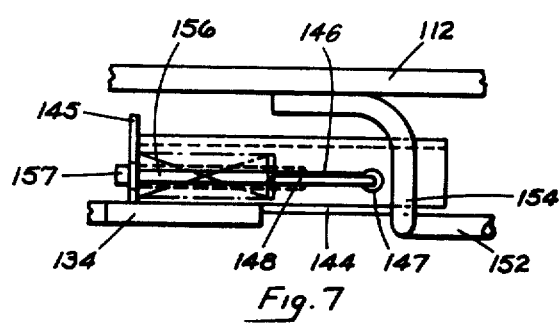
FIG. 7 is a view looking in the direction of the arrows along the line 7—7 in FIG. 4.

The hitch of the present invention is indicated in the drawings generally at 10. As shown in FIGS. 1 and 2 the hitch comprises a pair of jaws 12 mounted within a housing 14 including upper and lower plates 16 and 18. Torsion springs 20 urge the jaws into an open position. A yoke 22 includes a pair of yoke heads 24 which engage the jaws 12 and maintain the jaws in closed position engaging the king pin of a trailer to be transported on a railway flat car. A heavy coil spring 26 biases the yoke into the closed position. Spring 26 is held captive between spring plates 27 and 28.

The operation of jaws 12 and yoke 22 is described in U.S. Pat. Nos. 3,262,402; 3,225,707; and 3,234,893. Reference may be made to these patents for a detailed description of the operation of the jaws and yoke.

A collapsable support may be provided in the hitch of the present invention as disclosed in the above patents. Alternatively, a rigid support may be provided, for example as illustrated in U.S. Pat. No. 2,936,983.

In accordance with the present invention a cam assembly 30 is provided including a plate 31 which is pivotably mounted about a pin 32 on bottom plate 18. Cam plate 31 is illustrated as being of generally circular shape and includes an external surface 34 which engages the rear surface 23 of yoke 22. Plate 31 has attached thereto a tube 36 adapted to receive an operating bar 38. A torsion spring 39 biases cam wheel 31 into the position shown in FIGS. 1 and 2. A trip extension 37 is provided on cam wheel 31 and is conveniently formed integral with tube 36.

A yoke stop indicated at 40 (FIGS. 1-3) includes a block 42 supported by a spring 44 mounted within an opening 45 within bottom plate 18. Block 42 includes a tripping surface 42a and a distal end portion 43. Block 42 is held captive but free to pivot about spring 44 by means of a pair of spaced plates 47 which extend inwardly toward yoke 22, and a front plate 46 held in engagement with plates 47 with fasteners 47a. A stop 48 is pivotably mounted by means of pin 50 depending from block 42. The distal end portion 49 or stop 48 engages compression spring 52 mounted between the inner end 43 of block 42 and stop 48. The lower surface 54 of stop 48 is adapted to engage the upper surface 55 of yoke 22, as yoke 22 is moved toward the open position, and then to drop behind the yoke, engaging yoke rear surface 23 to hold the yoke in open position. Friction maintains stop 48 in place caused by the bias of spring 26.

Figure 9:
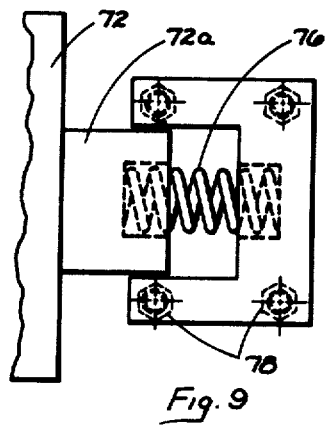
FIG. 9 is a view looking in the direction of the arrows along the line 9—9 in FIG. 8.
Figure 8:
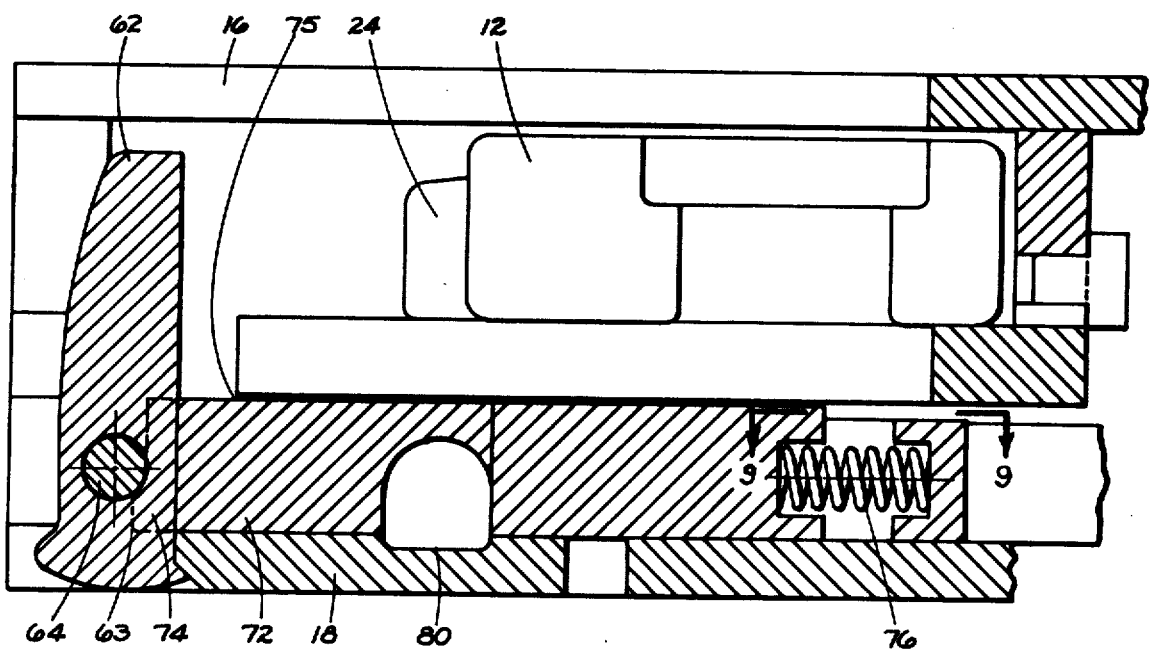
FIG. 8 is a sectional view looking in the direction of the arrows along the line 8—8 in FIG. 1.

An optical oneway gate 60 (FIGS. 1, 2, 8 and 9) may be provided including a gate member 62 mounted upon a shaft 64 which is journaled in brackets 66 mounted upon lower plate 18 with fasteners 68. A torsion spring 70 biases the oneway gate into the vertical position shown dotted in FIG. 1. Gate member 62 is prevented from moving in the counterclockwise direction by means of a stop 72 having lugs 74 which engage the lower edges 63 of gate 62. Stop 72 is biased into the forward engaged position by a spring 76 engaging end 72a (FIGS. 8 and 9) held in place with fasteners 78 extending through plate 18. An opening 80 is provided in stop 72 for receipt of a suitable operating bar.

An alternative oneway gate and its operation are described in U.S. Pat. No. 3,892,426 granted July 1, 1975.

In the operation of the embodiment shown in FIGS. 1-3 assuming that a king pin K is held in place by jaws 12 and yoke 22, in order to release the king pin, an operating bar 38 is inserted into tube 36 and cam wheel 30 is rotated in the clockwise direction in FIG. 2. This can be done by the operator from a position adjacent the side of the car. This moves the yoke 22 from right to left in FIGS. 1 and 2 toward an open position. The lower surface 54 of stop 48 rides on the moving upper surface 55 of yoke 22. As the cam wheel 30 is rotated, the trip extension 37 engages the tripping surface 42a of block 42. This depresses spring 44 and moves the distal portion 43 of block 42 upwardly. At approximately the same time the external surface 23 of yoke 22 passes below distal portion 43. Spring 52 urges stop 48 into a down position and when yoke 22 passes below, stop 48 engages the external surface 23 of yoke 22. Thus yoke 22 is held in an open position by stop 48. The operating bar is removed and cam wheel 30 returns to its original position under the bias of spring 39. Stop 48 remains in place due to friction between stop 48 and yoke cam surface 34 caused by the bias of spring 26. Torsion springs 20 move jaws 12 into an open position. For vertical unloading a crane may then be utilized to remove the trailer and king pin from the jaws 12. The yoke 22 should be moved forward slightly to release stop 48.

For circus unloading, if no oneway gate is present the operator then climbs on the car and drives the tractor to move jaws 12 and yoke 22 into the full open position overcoming the biase of spring 26. Moving yoke 22 further forward releases stop 48 which returns to its original position.

However if a oneway gate is present, the operator before climbing on the car inserts a bar into opening 80 and moves stop 72 from left to right against the bias of spring 76. When lugs 74 of stop 72 clear edges 63 of gate member 62, torsion spring 70 rotates gate member 62 counterclockwise to a full open position with lower portion 65 engaging stops 75 (shown in solid lines in FIG. 1). The operating bar is then removed and stop 72 returns to its original position. The operator climbs on the car, enters the cab and removes the trailer in a conventional manner. The gate 62 may be manually rotated clockwise to the original position in engagement with stop 72 when the trailer is removed. Alternatively, if the hitch is collapsed after removal of the trailer, a stop on the deck (not shown) may be provided to rotate gate member 62 to the original position.

The advantages of the present invention are apparent. Since the stop 48 automatically engages the external surface 23 of the yoke as the yoke passes below stop 48, the operator no longer has to manually operate such a stop while at the same time utilizing an operating bar to overcome the bias of spring 26. It is to be emphasized that spring 26 is a very stiff spring and considerable force is required on the part of the operator to overcome the bias of this spring. Furthermore with regard to U.S. Pat. No. 3,632,145, when stop 48 engages yoke 22, torsion spring 20 automatically moves jaws 12 to an open position. The operator can do this from the side of the car and need not mount the car to open the jaws as in U.S. Pat. No. 3,632,145. Thus there is added convenience and safety in this arrangement.

Another embodiment of the present invention is shown in FIGS. 4-7. In this embodiment the hitch 100 includes jaws 102 biased to the open position by means of torsion springs 104, and a yoke 106 having yoke heads 108 which engage jaws 102 in the closed position. A housing 110 includes an upper plate 112 and a lower plate or casting 114 upon which jaws 102 are rotatably mounted. A pair of side plates 120 and 122 are joined by a transverse plate 124 to complete the housing. A rear yoke plate 115 is welded to the rear end of yoke 106. A spring 116 biases the yoke 106 into the closed position engaging jaws 102. Spring 116 is held captive between yoke plates 117 and 118.

The cam assembly of this embodiment is indicated in the drawings generally at 130. This cam assembly includes an angle 132 which is welded to plate 124. A cam plate 134 is pivotably mounted upon angle 132 by means of a pin 136 and cotter 137. A spring 138 biases the cam wheel 134 into the position shown in solid lines in FIG. 4. A cap 140 maintains spring 138 and cam plate 134 in place. Cam plate 134 includes a cam surface 142 which engages rear yoke plate 115.

A support 150 is welded to top plate 112 (FIG. 5) including horizontal portion 151 and legs 152 and 154. A tube 144 is welded to a bracket 145 and to cam plate 134 which includes a slot 146 which receives a tripping plate 148. Slot 146 is provided with a curved head 147 at its inner end. A pin 156 is mounted within tube 144. Pin 156 includes a head 157 to maintain a spring 158 captive within the tube. Tube 144 is adapted to receive an operating bar 160. When the operating bar is inserted within tube 144 tripping plate 148 is moved inwardly against the bias of spring 158 and pin 156 is moved outwardly in the direction of the arrow 161 in FIG. 4.

A shaft 162 is mounted upon a bracket 164 which is welded to side plate 122. A support bracket 165 (FIG. 4) is also provided. A torsion spring 166 is held captive on shaft 162 by means of fastener 168 and a bracket 169 mounted upon plate 124. A tripping lug 170 is welded to first end portion 171 of shaft 162 and a yoke stop 172 is mounted upon the opposite end portion 173 of shaft 162.

As described in the embodiment shown in FIGS. 1-3 a oneway gate 180 may be provided including a gate member 182 mounted upon a shaft 184 by means of a pin 186. A torsion spring 188 urges the gate into the vertical position, but allows trailers to enter against the bias of this spring. A stop 190 is provided to prevent the king pin from exiting, having a pair of bracket supports 192 which are welded to hitch support structure 193.

Since this embodiment is intended for vertical loading and unloading, no means are shown for allowing gate 182 to move in the clockwise direction.

In the operation of this embodiment the operator from a position adjacent the side of the car inserts an operating bar 160 within tube 144 and the plate 134 is rotated in the counterclockwise direction about pin 136. As the operating bar is inserted into tube 144, plate 148 is moved inwardly along slot 146 against the bias of spring 158. Pin 156 moves out of tube 144 in the direction of the arrow 161 in this operation. Cam surface 142 moves yoke plate 115 and moves the yoke 106 forwardly toward an open position. When operating bar 160 engages leg 152, yoke 106 will have moved from left to right sufficiently to allow jaws 102 to open. The operating bar 160 may be removed. As the operating bar is removed, plate 148 under the bias of spring 158 engages lug 170 and rotates shaft 162 against the bias of torsion spring 166 and yoke stop 172 is moved into a position to engage the end 107 of yoke 106. Cam wheel 134 returns to its original position shown in solid lines in FIG. 5 under the bias of spring 138. Friction holds stop 172 in engagement with the end 107 of yoke 106. An overhead crane moves the trailer upwardly and outwardly. When yoke 106 is moved outwardly slightly stop 172 rotates back to its original position.

What is claimed is:

1. In a trailer hitch having a pair of movable jaws pivotably mounted relative to a hitch housing and adapted to assume a first closed position engaging and holding in place the kingpin of a piggyback trailer; jaw resilient means biasing said jaws toward an open position; yoke resilient means biasing a yoke into a first engaged position engaging said jaws to maintain said jaws in said first closed position; the improvement comprising: a cam assembly comprising a cam plate rotatably mounted upon said hitch housing having a cam surface which engages said yoke to move said yoke from said first engaged position to a second remote position; means for moving said cam plate causing said yoke to move from said first position to said second remote position, allowing said jaws to assume an at least partially open position relative to the kingpin due to the bias of said jaw resilient means; and stop means mounted on the hitch adapted to be automatically actuated by movement of said cam assembly whereby to move said stop means into a stop position engaging and preventing return of said yoke to said first engaged position, allowing said jaws to assume said partially open position to facilitate removal of said kingpin from said jaws.

2. A trailer hitch according to claim 1 wherein said cam assembly includes means for engaging said stop means as said cam assembly is moved from said first position to said second remote position.

3. A trailer hitch according to claim 2 wherein said stop means engage an end surface of said yoke.

4. A trailer hitch according to claim 1 wherein said cam assembly comprises a cam plate rotatably mounted upon a hitch housing having a cam surface which engages said yoke at least in said second remote position.

5. A trailer hitch according to claim 4 wherein said cam assembly includes cam resilient means resiliently biasing said cam into said first position.

6. A trailer hitch according to claim 4 wherein the means for moving said cam includes means for receiving an operating bar.

7. A trailer hitch according to claim 1 wherein said stop means includes a yoke stop which is pivotably mounted upon support structure adjacent said yoke and wherein said cam includes means for engaging said yoke stop and pivoting said yoke stop into said stop position.

8. A trailer hitch according to claim 1 wherein said stop means includes a stop mounted upon a rotatable shaft, and wherein said cam assembly includes means which engage said shaft to rotate said shaft into said stop position.

9. A trailer hitch according to claim 1 wherein said stop means includes a stop mounted upon a rotatable shaft, and wherein said cam assembly includes means which engages said shaft to rotate said shaft into said stop position.

10. A trailer hitch according to claim 9 wherein said stop engages an end surface of said yoke.

11. A trailer hitch according to claim 9 wherein a tripping plate is mounted on said cam plate which engages a tripping lug on said shaft.

12. A trailer hitch according to claim 11 wherein said tripping plate is resiliently biased to a position adapted to engage said tripping lug to rotate said shaft into said stop position when said cam plate is moved to cause said yoke to assume said second remote position.

* * * * *